Oct. 7, 1941.     J. H. MURCH     2,257,758
CHAIN TIGHTENER DEVICE
Filed June 15, 1939
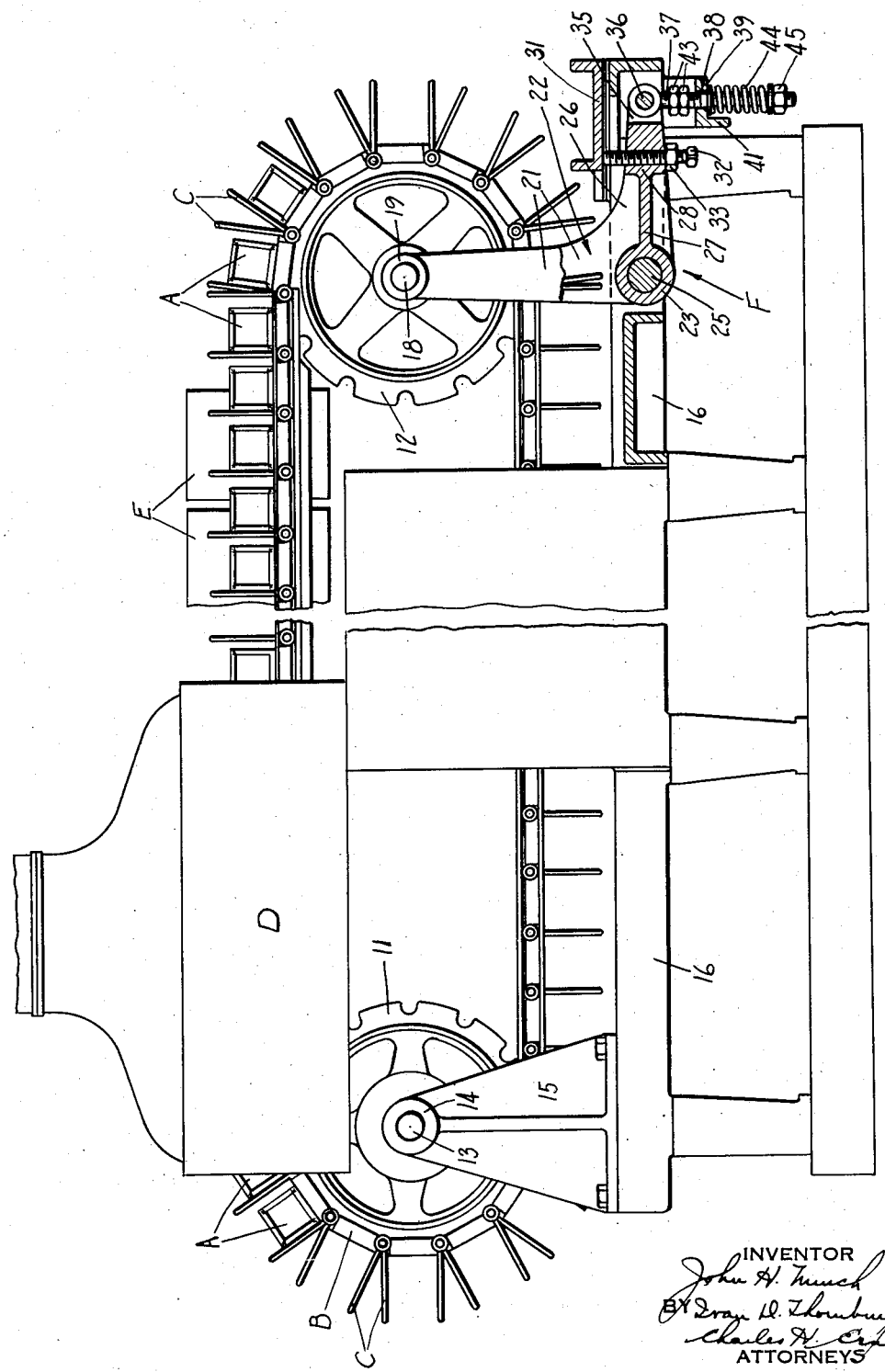

Patented Oct. 7, 1941

2,257,758

UNITED STATES PATENT OFFICE 2,257,758

CHAIN TIGHTENER DEVICE

John H. Murch, East Orange, N. J., assignor to American Can Company, New York, N. Y., a corporation of New Jersey Application June 15, 1939, Serial No. 279,355

2 Claims. (Cl. 198—208)

The present invention relates to a chain tightener device for conveyors and the like which are subject to expansion and contraction and has particular reference to maintaining the conveyor taut within predetermined limits so as to prevent parts of the conveyor from becoming out of register with other parts of the machine in which it operates.

In the manufacture of articles which require heat treatment, conveyors of various types are used for carrying the articles through an oven or the like so that they may be heated. The same conveyor may also carry the heat treated articles through a cooling station or out into the open atmosphere for cooling. Such a conveyor is thus continually subjected to varying heat conditions which result in varying degrees of expansion and contraction. Hence at times the conveyor may be too loose or at other times it may be too tight.

In some machines of this character various operations are performed on the articles at spaced working stations as the articles are propelled through the machine and these articles must be brought into register with the work performing devices at the stations. When the conveyor is subject to expansion or contraction considerable difficulty is sometimes experienced in properly registering the articles at the working stations.

The present invention contemplates overcoming these difficulties by providing a chain tightener device which will keep the conveyor taut within predetermined limits while allowing it to undergo some change in length due to expansion or contraction, but this is done so that any strain of tightening is so applied that it will not elongate the conveyor chains adversely thereby maintaining the articles on the conveyor in proper position for correct register with the operating devices at the working stations.

An object therefore of the invention is the provision of a conveyor tightening device for conveyors which are subject to expansion and contraction wherein the conveyor is maintained taut within predetermined limits so that the strain of tightening the conveyor will not stretch it beyond the natural degree of expansion inherent therein thus maintaining the original length of the conveyor as much as possible.

Another object is the provision of such a conveyor tightening device wherein the working limits of the device may be changed at will to permit greater or lesser control over the operation thereof.

Numerous other objects and advantages of the invention will be apparent as it is better understood from the following description, which, taken in connection with the accompanying drawing, discloses a preferred embodiment thereof.

Referring to the drawing: the single figure is a side elevation of an article treating machine embodying the instant invention, parts being broken away and other parts being shown in section.

As a preferred embodiment of the invention the drawing illustrates a container or can making machine of the character which heat treats fibre cans A and performs certain operations on them as they are conveyed along a predetermined path of travel through the machine. The cans A are carried in spaced relation on a continuously moving endless chain conveyor B having spaced prongs C which separate the cans and retain them in proper position.

The conveyor B carries the cans first through a heat treating oven D and then past a plurality of working stations E at which the heated cans are brought into register with devices located at the stations for performing certain operations on them. These stations are out in the open beyond the heating oven D. The cans are preferably brought to rest at the stations for the performance of such operations and for this purpose the chain conveyor is preferably operated in a step-by-step or intermittent motion. After the performance of such operations the cans are discharged from the conveyor in any suitable manner.

The endless chain conveyor B preferably takes over a pair of spaced sprockets 11, 12 which are rotated in any suitable manner in time with the other moving parts of the machine. Sprocket 11 is disposed at the can entrance end of the machine and is mounted on a transverse horizontal shaft 13 journaled in bearings 14 formed in a pair of stationary brackets 15 bolted to a frame 16. There is one of these brackets on each side of the sprocket. Frame 16 is the main frame of the machine and supports all the parts thereof including the oven D and the devices located at the working stations E.

At the opposite or discharge end of the machine the sprocket 12 is carried in a conveyor tightening device F which will now be explained. The sprocket is mounted on a transverse horizontal shaft 18 journaled in bearings 19 of a pair of movable spaced and parallel upright lever arms 21, one on each side of the sprocket. The arms constitute part of a bell crank 22 having a long connecting hub 23 on which the arms are formed. This hub is mounted on a pivot shaft 25 which is carried in suitable bearings formed in the machine frame 16.

At the bell crank hub 23 the upright arms 21 merge into a pair of spaced and parallel horizontal arms 26 which are transversely connected by an integral web section 27. The web terminates at the outer ends of the arms in an enlarged boss 28. These horizontal arms extend toward the discharge end of the machine and project under a stop plate 31 secured to the machine frame 16. A vertically disposed inverted setscrew 32 carrying a locknut 33 is threadedly engaged in the boss 28 at its transverse middle and extends up beyond the boss into engagement with the stop plate 31. This setscrew constitutes one of the limiting elements of the tightening device and will be more fully explained hereinafter.

Extending beyond the bell crank 22 there is a lug 35 which is formed on the boss 28 at its transverse middle, i. e., adjacent the setscrew 32. The lug carries a pivot pin 36 which supports a threaded eye-bolt 37. The shank of the eye-bolt extends down through a hole 38 in a web 39 of a cross bracket 41 secured to the machine frame. Above the web the bolt shank carries a pair of locknuts 43. Below the web the bolt is surrounded by a compression spring 44 which is held in place by a nut 45. The nut may be adjusted to control the pressure of the spring 44.

Hence the spring 44 in exerting its presure on the nut 45 and the web 39 of the bracket 41, draws the eye-bolt 37 down and thus tends to rock the bell-crank 22 to the right or in a clockwise direction on its pivot shaft 25. This pulling action keeps the sprocket 12 tight against the conveyor chain B and thus maintains the latter in a taut condition.

When the conveyor chain B is subjected to heat and tends to stretch or elongate, the spring 44 takes up this elongation by rocking the bell-crank 22 outwardly on its pivot shaft 25. However, in order to prevent pulling the chain so taut that its prongs C will not properly register the articles A propelled thereby with the working stations E, provision is made to limit the movement of the bell-crank 22. This limitation is effected by the locknuts 43 on the eye-bolt 37 hereinbefore mentioned.

The locknuts 43 may be set as desired so that the spring 44 will rock the bell crank only a predetermined distance before the nuts engage against the web 39 of the cross-bracket 41. Thus when the chain stretches sufficiently to permit the spring to bring the locknuts into engagement with the bracket web, the chain cannot be further pulled and hence the prongs thereon will remain in position to register the cans A with the working stations E, when cans stop at them during an operating cycle.

In a similar manner the setscrew 32 controls the contraction of the conveyor. In this case contraction of the conveyor will tend to rock the bell-crank 22 inwardly and hence shift the locknuts 43 of the eye-bolt 37 away from the web 39 against the resistance of the spring 44. This same action will bring the setscrew 32 in the bell-crank into engagement with the stop plate 31 as shown in the drawing. This prevents further inward rocking of the bell-crank and hence creates a restraint on further contraction of the chain. This prevents the prongs C of the conveyor from being thrown out of position in a direction opposite to that explained above.

The setscrew 32 and the locknuts 43 may be adjusted as desired to insure proper position of the prongs of the conveyor to correctly register the cans in the working stations. In this manner close control may be had over the change in length of the conveyor under varying heat conditions.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveying mechanism for advancing articles through a heat treating machine, including a frame having means mounted thereon for supporting spaced sprockets at the front and rear thereof and an endless chain conveyor passing over said sprockets for carrying articles in processional order through the machine, said chain being subject to change in overall dimension due to temperature variations, the combination of conveyor tightener devices including a rigid bell crank lever pivotally mounted on said frame and in which one of said sprockets is journaled, an arm of said lever extending away from said chain, spring means carried by the end of said arm and bearing against said frame thereby tending to rock the lever and its supported sprocket outwardly and maintain the chain taut, means disposed between said spring means and the outer end of said lever arm and engageable with said frame to limit expansion of said chain, and means disposed inwardly of the outer end of said lever arm and engageable therewith and with said frame to limit contraction of said chain, whereby the overall of dimension of said conveyor chain is controlled and maintained within predetermined limits.

2. In a conveying mechanism for advancing articles through a heat treating machine, including a frame having means mounted thereon for supporting spaced sprockets at the front and rear thereof and an endless chain conveyor passing over said sprockets for carrying articles in processional order through the machine in spaced relation to register the articles with working stations of the machine, said chain being subject to change in overall dimension due to temperature variations, the combination of conveyor tightener devices including a rigid bell crank lever pivotally mounted on said frame and having an arm in which said rear sprocket is journaled, the other arm of said lever extending away from said chain, spring means carried by the end of said other lever arm and bearing against said frame thereby tending to rock the lever and its supported sprocket outwardly and maintain the chain taut, adjustable means disposed between said spring means and the outer end of said other lever arm and engageable with said frame to limit expansion of said chain, and adjustable means carried by said other arm inwardly of its outer end and engageable with said frame to limit contraction of said chain, whereby the overall of dimension of said conveyor chain is controlled and maintained within predetermined limits.

JOHN H. MURCH.